(Model.)
2 Sheets—Sheet 1.
A. WEHRMAN.
REPLANTING ATTACHMENT FOR CULTIVATORS.
No. 529,686.
Patented Nov. 20, 1894.
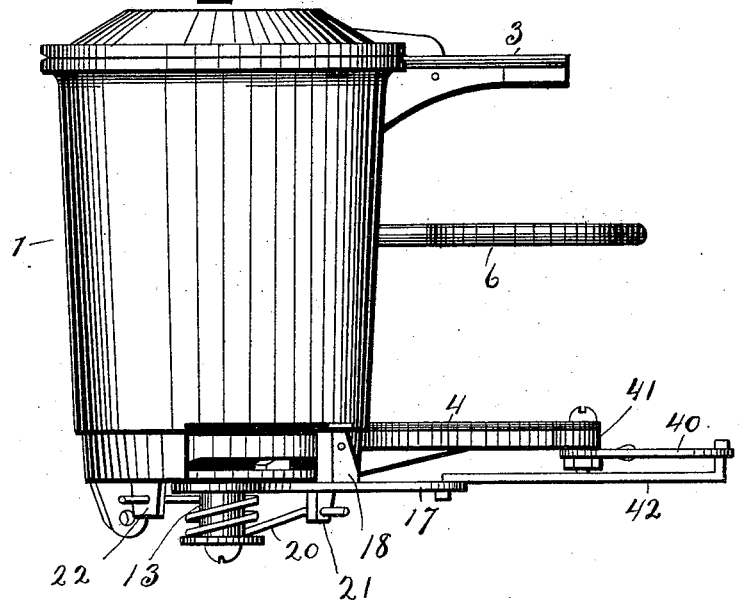
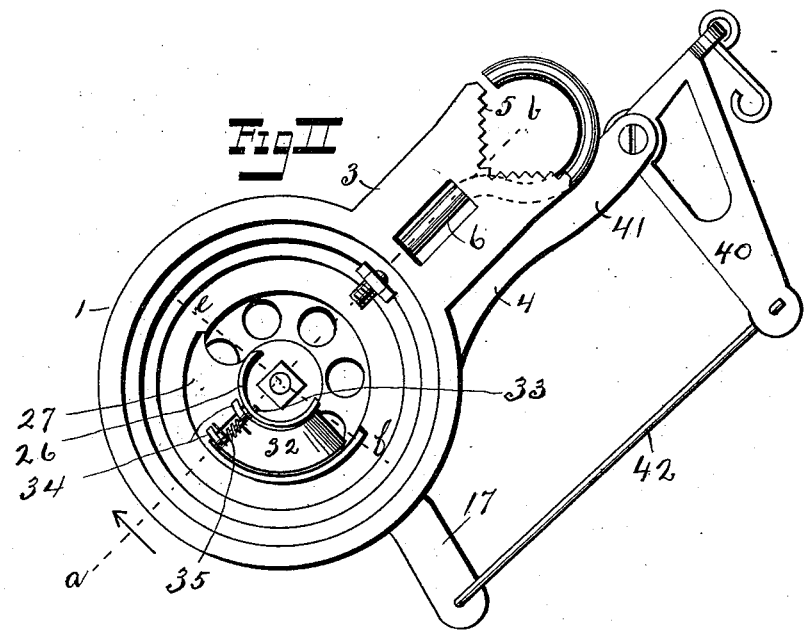
Witnesses
H. C. Mowrer
R. H. Couse
August Wehrman.  Inventor
By his Attorney Warren D. House.

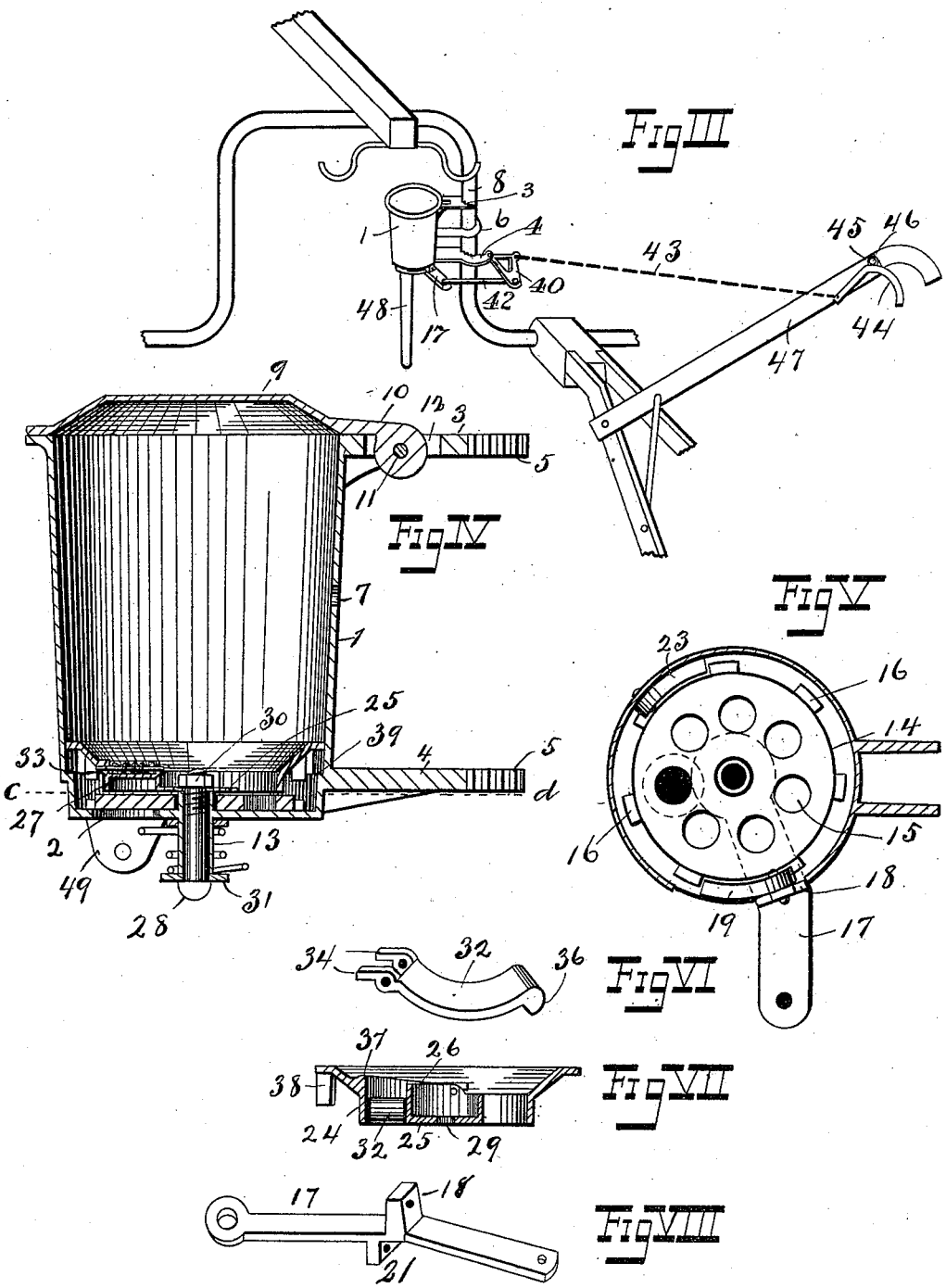

UNITED STATES PATENT OFFICE.

AUGUST WEHRMAN, OF EMPORIA, KANSAS.

REPLANTING ATTACHMENT FOR CULTIVATORS.

SPECIFICATION forming part of Letters Patent No. 529,686, dated November 20, 1894.

Application filed March 31, 1893. Serial No. 468,413. (Model.)

*To all whom it may concern:*

Be it known that I, AUGUST WEHRMAN, a citizen of the United States, residing at Emporia, in the county of Lyons and State of Kansas, have invented certain new and useful Improvements in Replanting Attachments for Cultivators, of which the following is a specification, reference being had therein to the accompanying drawings.

My invention relates to improvements in replanting attachments for cultivators.

The object of my invention is to provide a seed dropping mechanism adapted to be secured to one side of the arch of a cultivator and which has connection by a chain or rod with a device mounted upon one of the handles of the cultivator by means of which the seed dropper may be operated at the same time that the hand is being used to guide the plows.

My invention consists further, in the mechanism by means of which the seed dropper may be quickly and rigidly secured to one side of the arch, thus obviating the objections arising from the use of the cross bar spanning the arch and which has been commonly used heretofore as a means of supporting the dropping mechanism.

My invention consists further in special features of construction, which are hereinafter fully described.

In the accompanying drawings, illustrative of my invention—Figure I represents my invention in side elevation. This view is taken from a point best adapted to show the spring retracted lever and its attached ratchet pawl. Fig. II represents a plan view of the parts shown in Fig. I, the cover of the grain holder being removed, so as to give a top view of the hopper and the location therein of the spring actuated cut-off. This view also clearly shows the location of the dropping disk and the bell crank lever and the manner of connecting the bell crank lever with the ratchet dog lever. Fig. III represents in perspective a portion of a cultivator and illustrates the manner of connecting my invention therewith. In this view the cover of the seed holder is removed. Fig. IV represents a vertical sectional view taken on the dotted line *a—b*, looking in the direction indicated by the arrow of Fig. II, the hook 6, being removed. Fig. V represents a horizontal sectional view taken on the dotted line *c—d* of Fig. IV, the bolt for holding the hopper in position being removed, and the opening in the bottom of the grain holder being shown in dotted lines. Fig. VI represents a perspective view of the cut-off. Fig. VII represents a vertical sectional view of the hopper taken on the dotted line *e—f* in Fig. II. Fig. VIII represents a perspective view of the ratchet pawl lever.

Similar numerals of reference indicate similar parts throughout the different views.

1, indicates the grain holding vessel which is preferably a casting made in the form of the frustum of a hollow cone the lower end of which is provided with a bottom having an exit opening 2, for the grain. The upper or larger end of the holder 1, is provided at one side with a projection 3, extending horizontally therefrom and having its extreme outer end V-shaped. A similar horizontal projection 4, extends from the lower end of holder 1, in a direction parallel to the projection 3, its outer end being V-shaped, the same as projection 3. Each of the V-shaped ends of the projections 3, and 4, are provided with a series of teeth 5, similar to the teeth of a saw. A bolt 6, hook-shaped at one end and having the other end screw-threaded and with a nut mounted thereon, is adapted to have the screw-threaded end pass through an opening 7, in the wall of the holder and midway between the two projections, 3, and 4. The hooked end of the bolt 6, is adapted to partially encircle one of the vertical legs 8, of the cultivator arch. A cover 9, adapted to fit the top of the holder 1, is provided with a lug 10, which has a horizontal opening bored therein, within which is fitted a pivot pin 11, the outer ends of which are fitted to openings on either side of a vertical slot 12, located within projection 3. Best shown in Fig. IV. The bottom of the holder 1, is provided with a central hollow post 13, extending vertically both above and below the bottom plate. A flat circular drop plate 14, is provided with a central vertical opening, loosely fitted to the upper end of the post 13. A series of drop openings 15, are bored vertically through the said plate 14, concentrically with the periphery of said drop plate. A series of ratchet teeth 16, corresponding in number to the drop openings 15, are provided upon the periphery of the drop plate 14. The operating position of the drop plate 14, is directly against the top of the bottom plate of the holder 1, the openings 15, in the drop plate being so arranged that each will pass over the opening 2, in the bottom plate of the holder when the disk 14, is revolved. A lever 17, has one end pivoted upon the post 13, and immediately against the bottom of the bottom plate of the holder 1. A ratchet pawl 19, is pivoted to the inner side of a vertical lug 18, upon the upper side of the horizontal lever 17, and is adapted to have its free end engage successively with the teeth 16, on the drop plate 14. A peripheral opening is provided in the side near the bottom of the holder 1, in which the lug 18, may operate when the lever 17, is moved forward and backward. A coiled wire spring 20, encircles the projection 13, beneath the bottom plate of the holder 1, and has one end passed through an opening in a vertical lug 21, located on the lower side of the lever 17, and the other end passed through an opening in a vertical lug 22, extending downward from the bottom plate of the holder 1. This torsion or coil spring 20, is so wound as to have a tendency to force the lever 17, in such a direction as to draw the pawl 19, backward over the ratchet teeth 16.

Pivoted to the inner lower side of the holder 1, is a pawl 23, facing circumferentially in the same direction as pawl 19. This pawl 23, is located between the inner periphery of the holder 1, and the outer periphery of the dropping disk 14, and in such a manner that the ratchet teeth 16, may pass thereunder. A funnel-shaped hopper 24, is located within the holder 1, and near the bottom thereof and having the upper or larger end of such diameter that the hopper fits neatly within the said holder 1. A horizontal disk 25, is provided with a semi-circular vertical wall 26, which is connected by a bridge 27, shown in Fig. IV, with the vertical wall of the hopper 24. This disk 25, best shown in Figs. IV and VII, bears upon the upper end of the post 13, and it is secured thereto by means of a bolt 28, screw-threaded at its upper end and passing through a central vertical opening 29, in the disk 25, and a vertical opening in the post 13.

Upon the upper threaded end of the bolt 28, and upon the upper side of the disk 25, is a nut 30. Clamped between the head on the lower end of the bolt 28, and the lower end of the post 13, is a horizontal washer 31, which serves to retain the coil spring 20, upon said post 13. A semi-circular cut-off plate 32, the form of which is shown in Figs. II and VI, is pivoted at one end between the semi-circular wall 26, and the vertical wall of the hopper 24, upon a horizontal pin 33, radially located in openings in the semi-circular wall 27, and the vertical wall of the hopper 24. The rear or pivoted end of the cut-off 32, is contiguous to one edge of the bridge 27.

Between two rearwardly extending lugs 34, upon the rear end of the cut-off 32, is a torsion spring 35, which is coiled about the pivot pin 33, and has one end bearing upon the upper surface of the cut-off 32, and the other end bearing upon the upper surface of the bridge 27. Best shown in Fig. II. The front or free end of the cut-off 32, is provided with a downwardly extended rounded projection which bears upon the upper surface of the drop plate 14, and immediately above the drop openings 15. A semi-circular projection 37, upon the vertical wall of the hopper 24, affords a guard upon one side of the cut-off 32, and prevents the grains in the hopper from passing under the cut-off on this side, the semi-circular wall 26, serving in the same capacity upon the other side of the cut-off at such times as when the free end of the cut-off is slightly raised. The rearwardly projecting lugs 34, by coming in contact with the upper surface of the bridge 27, limit the upward movement of the free end of the cut-off 32. Lugs 38, projecting from the lower side of the peripheral flange upon the hopper 24, enter corresponding recesses in the annular shoulder 39, in the lower end of holder 1, as illustrated in Fig. IV. These serve to keep the hopper from shifting or moving circumferentially from its proper position in the holder. A horizontal bell crank lever 40, is pivoted to an extension 41, of one side of the projection 4. One end of the bell crank lever 40, is connected by means of a pitman rod 42, with the extreme outer end of the ratchet lever 17. The other free end of the bell crank lever is connected by a rod or chain, 43, as indicated by the heavy dotted line in Fig. III, with one end of a bell crank lever 44, which is provided with a lug 45, at the angle through which passes a screw 46, which enters the inner side of the cultivator handle 47. This screw 46, serves as a pivot support for the bell crank lever 44. The free arm of the bell crank lever 44, is curved suitably for engagement by the hand and is in close proximity to the hand hold of the cultivator handle 47.

I will now proceed to describe the operation of my invention:—Referring to Fig. III, the holder 1, is placed against the right vertical arm of the arch 8, of the cultivator, the V-shaped openings of the projecting arms 3, and 4, being placed against the inside of the arch. The hook bolt 6, is then passed through the opening 7, in the holder with the hooked end around the outer side of the arch. A nut is now screwed on the inner end of the bolt 6, inside the holder 7, thus causing the hooked bolt 6, to draw the holder tightly against the arch. The teeth 5, in the V-shaped ends of the arms 3, and 4, serve to prevent any circumferential motion of the grain holder arms 3, and 4, upon the arch. A common rubber grain drill tube 48, Fig. III, is secured in any suitable manner to a vertical lug 49, upon the lower side of the bottom plate of the holder 1. Shown in Figs. I and IV. The location of the lug 49, is contiguous to the opening 2, Fig. IV, so that the drill tube 48, when in position, may have its opening directly below the exit opening 2, in the bottom plate of the holder. The bell crank 44, is now secured in its proper position by means of the screw 46, upon the inner side of the cultivator handle 47.

As this invention is adapted to be used upon those cultivators which are already upon the market, and as the handles of such vary as regards their lengths, I connect the two bell crank levers preferably by means of a chain, although a rod may be used. In using a chain for such a connection, it is much more convenient to obtain the length suitable, as the chain may be easily and quickly severed, the link remaining serving as a means of connection with the bell crank lever 44. While cultivating the corn or other cereal, when the driver arrives at a hill which is barren, he uses the hand which is holding the handle 47, for drawing backward and upward the free arm of the bell crank lever 44. This motion will be communicated to the bell crank lever 40, which in turn, through the intermediacy of the pitman 42, forces the ratchet lever 17, to the left, as illustrated in the drawings, causing the pawl 19, to engage with one of the ratchet teeth 16, causing a partial revolution of the drop plate 14. The corn or other grain which has been placed in the holder 1, fills such of the drop openings 15, in the drop plate 14, as are not covered by the bridge 27, and the cut-off 32. As the pawl 19, revolves the disk 14, the several drop openings pass consecutively below the cut-off 32, and over the exit orifice 2, in the bottom of the holder, the corn held within said drop opening falling through the exit orifice 2, and the flexible tube 48, to the ground in which it is immediately after buried by the cultivator plows. If, upon one of the drop openings passing below the free end of the cut-off 32, the kernels of grain are so packed within said drop opening as to be above the surface of the drop plate, they will force the free end of the drop plate upward and against the tension of the torsion spring 35, which will immediately cause the free end of the cut-off to return to its normal position upon the surface of the drop plate as soon as the projecting kernels have been carried to the outlet opening. The spring tension upon the cut-off serves to prevent the ejection of more than the required number of grains. This end is accomplished without cutting or destroying any of the kernels. If for any cause one or more of the grains do not pass from the drop opening into the tube 48, they are carried around under the bridge 27, and are ejected during the next revolution of the drop plate. Upon releasing the pressure of the hand upon the bell crank lever 44, the torsion spring 20, throws the ratchet lever 17, back to its original position, the pawl 23, preventing any backward movement of the drop plate. The lugs 34, upon the rear end of the cut-off 32, serve to prevent the free end of the cut-off from being raised above a certain height, and the concentric walls 26, and 27, within which the cut-off operates, serve to prevent grains from entering below the cut-off excepting at the proper place.

Having thus described my invention, what I claim, and desire to secure by Letters Patent, is—

1. In a replanting attachment for cultivators, the combination with a seed holder provided with a seed dropping mechanism, of a jaw or jaws connected with the seed holder for engaging one of the legs of the arch of the cultivator, and means for fastening the jaw or jaws in such engagement, substantially as described.

2. In a replanting attachment for cultivators, the combination with a seed holder provided with a seed dropping mechanism, of a jaw or jaws connected with the seed holder for engagement with one of the legs of the cultivator arch, of a hook connected with the said leg of said arch and the seed holder, and means connected with the seed holder and said hook for drawing the said jaw or jaws rigidly in contact with the cultivator arch, substantially as described.

3. In a replanting attachment for cultivators, the combination with a seed holder provided with a seed dropping mechanism, of a jaw or jaws provided with teeth adapted to engage with one of the legs of the cultivator arch, a screw-threaded bolt having a hook at one end for engaging the opposite side of the said leg of the cultivator arch and having the screw-threaded end of said bolt passing through the wall of the seed holder, and a nut mounted upon the screw-threaded end of said bolt within the seed holder, substantially as described.

4. In a replanting attachment for cultivators, the combination with a seed holder provided with a seed dropping mechanism, of an upper and lower jaw connected respectively with the top and bottom of said seed holder, said jaws partially encircling one of the legs of the arch of the cultivator, means connected with the said holder and said leg of the arch for rigidly securing the jaws in engagement with the said leg of the arch, and an operating device mounted upon the handle of the cultivator near the hand hold and connected with the seed dropping mechanism, substantially as described.

5. In a replanting attachment for cultivators, the combination with a seed holder provided with a seed dropping mechanism, of a pair of jaws connected with the seed holder for engaging one of the legs of the arch of the cultivator, means for rigidly locking the said jaws in such engagement, a bell crank lever mounted upon the cultivator handle near the hand hold, and a bell crank lever pivoted upon one of said jaws, and connected with the seed dropping mechanism and one of the arms of the other bell crank lever, substantially as described.

6. In a replanting attachment for cultivators, the combination with a seed holder provided with a seed dropping mechanism, a spring retracted lever pivoted to the seed holder for operating the seed dropping mechanism, a pair of jaws connected with the seed holder for engaging the arch of the cultivator, a screw-threaded bolt having a hooked end partially encircling the said arch, and having the other end passed through the seed holder between the two jaws, a nut mounted upon the screw-threaded end inside the seed holder, an operating lever pivoted upon the cultivator handle, and connected with the said spring retracted lever, substantially as described.

In testimony whereof I affix my signature in presence of two witnesses.

AUGUST WEHRMAN.

Witnesses:
FRANK C. WARD,
WILLIAM W. FENNER.